United States Patent
Shen et al.

(10) Patent No.: US 11,310,084 B2
(45) Date of Patent: Apr. 19, 2022

(54) DISTRIBUTED DYNAMIC POWER SAVINGS FOR ADAPTIVE FILTERS IN A HIGH-SPEED DATA CHANNEL

(71) Applicant: Marvell Asia Pte, Ltd., Singapore (SG)

(72) Inventors: David Shen, Saratoga, CA (US); Oliver Weiss, Kaarst (DE)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/248,082

(22) Filed: Jan. 8, 2021

(65) Prior Publication Data

US 2021/0218606 A1 Jul. 15, 2021

Related U.S. Application Data

(60) Provisional application No. 62/978,689, filed on Feb. 19, 2020, provisional application No. 62/959,682, filed on Jan. 10, 2020.

(51) Int. Cl.
| | |
|---|---|
| *H04L 25/03* | (2006.01) |
| *H04B 3/23* | (2006.01) |
| *H04L 25/02* | (2006.01) |

(52) U.S. Cl.
CPC ....... *H04L 25/03885* (2013.01); *H04B 3/237* (2013.01); *H04L 25/0212* (2013.01); *H04L 25/03044* (2013.01); *H04L 25/03057* (2013.01)

(58) Field of Classification Search
CPC ... H04B 1/38; H04B 1/40; H04B 3/04; H04B 3/23; H04B 3/237; H04B 3/32; H04B 3/34; H04L 25/0212; H04L 25/026; H04L 25/0272; H04L 25/03006; H04L 25/03019; H04L 25/03025; H04L 25/03044; H04L 25/03057; H04L 25/03885

USPC ............ 375/219, 220, 232, 233, 254, 285; 370/282, 286, 289–291; 379/406.01, 379/406.05, 406.08; 708/322, 323

See application file for complete search history.

(56) References Cited

U.S. PATENT DOCUMENTS

| | | | |
|---|---|---|---|
| 8,625,704 B1 * | 1/2014 | Sedarat ................... | H04B 3/32 375/285 |
| 2007/0014378 A1 * | 1/2007 | Parhi ....................... | H04B 3/32 375/267 |
| 2007/0280388 A1 | 12/2007 | Torre et al. | |

(Continued)

FOREIGN PATENT DOCUMENTS

EP 0 333 718 9/1989

*Primary Examiner* — Young T. Tse

(57) ABSTRACT

A physical layer transceiver for a wireline channel medium includes a host interface to a host device, a line interface to the medium, encoding/decoding circuitry for interfacing between the host device and the medium, and adaptive filter circuitry coupled to the encoding/decoding circuitry. The adaptive filter circuitry includes a plurality of filter taps, each corresponding to a segment of the medium, and capable of being powered ON and OFF separately from each other filter tap. Adaptive control circuitry can power ON a first subset, fewer than all the filter taps, corresponding to segments distributed along the medium, monitor powered-ON filter taps for occurrence of interference events, and upon detection of an interference event at a particular segment to which a particular powered-ON filter tap corresponds, power ON one or more additional filter taps corresponding to one or more segments in a vicinity of the particular segment.

24 Claims, 6 Drawing Sheets

(56) References Cited

U.S. PATENT DOCUMENTS

| | | | |
|---|---|---|---|
| 2008/0095283 A1* | 4/2008 | Shoor | H04L 25/03038 375/350 |
| 2008/0160915 A1* | 7/2008 | Sommer | H04B 3/32 455/63.1 |
| 2010/0074310 A1* | 3/2010 | Roo | H04B 1/581 375/219 |
| 2010/0086019 A1* | 4/2010 | Agazzi | G01R 31/3008 375/233 |
| 2016/0134443 A1* | 5/2016 | Berke | H04L 25/03885 375/232 |
| 2017/0070212 A1* | 3/2017 | Kultran | H03H 15/00 |

* cited by examiner

DISTRIBUTED DYNAMIC POWER SAVINGS FOR ADAPTIVE FILTERS IN A HIGH-SPEED DATA CHANNEL

CROSS REFERENCE TO RELATED APPLICATIONS

This disclosure claims the benefit of, commonly-assigned U.S. Provisional Patent Applications No. 62/959,682, filed Jan. 10, 2020, and 62/978,689, filed Feb. 19, 2020, each of which is hereby incorporated by reference herein in its respective entirety.

FIELD OF USE

This disclosure relates to the use of adaptive filters for equalization of a high-speed data channel. More particularly, this disclosure relates to the dynamic powering down and powering up of segments of adaptive filters in response to dynamic changes in the channel being filtered.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Physical layer (PHY) devices for high-speed wireline serial communications, such as 1000 Base-T or 10G Base-T lines, typically use adaptive filters for equalization, including cancellation of echo, crosstalk and/or radiofrequency (RF) interference. A typical adaptive filter may include echo cancellation (EC) circuitry, near-end crosstalk (NEXT) cancellation circuitry, and/or far-end crosstalk (FEXT) cancellation circuitry. The adaptive filter may have a plurality of taps, with each tap covering a segment of the cancellation circuitry, corresponding to a respective segment of the wireline link. The coefficients of each segment are adapted with an algorithm such as, e.g., least-mean-squares, to maximize the effectiveness of the cancellation circuitry. However, in typical cancellation scenarios, the crosstalk or echo points are localized at certain sections along a particular cable. This means that there are also segments along the cable that do not have significant crosstalk or echo. As a result, power is wasted in running and updating some filter segments that may not be needed. The filter segments may have individual power-down capability, and one possible way to address the issue of running unnecessary filter segments is to power down (i.e., power OFF) those segments which have very low coefficient values. However, the powering down of such segments typically would be an irreversible process, because once a particular segment has been powered down, there would be no more information available from that segment to determine if a dynamic change in the channel—which could be a result of environmental changes such as temperature or physical changes, such as bending of the cable—has occurred that might require that the segment be powered back up (i.e., powered back ON) to deal with some newly-occurring interference.

SUMMARY

A physical layer transceiver in accordance with implementations of the subject matter of this disclosure, for connecting a host device to a wireline channel medium having a cable length, includes a host interface for coupling to the host device, a line interface for coupling to the wireline channel medium, encoding/decoding circuitry operatively coupled to the host interface and the line interface for interfacing between the host device and the wireline channel medium, and adaptive filter circuitry operatively coupled to the encoding/decoding circuitry. The adaptive filter circuitry includes a plurality of filter taps, each filter tap in the plurality of filter taps corresponding to a segment of the cable length of the wireline channel medium, and is capable of being powered ON and OFF separately from each other filter tap in the plurality of filter taps. Adaptive control circuitry is configured to power ON a first subset of the plurality of filter taps, fewer than all of the filter taps, corresponding to segments distributed along the cable length of the wireline channel medium, monitor powered-ON filter taps for occurrence of interference events, and upon detection of an interference event at a segment to which a particular powered-ON filter tap corresponds, power ON one or more additional filter taps corresponding to one or more segments in a vicinity of the segment to which the particular powered-ON filter tap corresponds.

In a first implementation of such a physical layer transceiver, the adaptive control circuitry is configured to initially power ON, as the first subset of the plurality of filter taps, filter taps corresponding to segments that are distributed along the cable length of the wireline channel medium.

In a first instance of the first implementation, the adaptive control circuitry may be configured to initially power ON, as the first subset of the plurality of filter taps, every other filter tap, corresponding to every other segment along the cable length of the wireline channel medium, such that both taps neighboring each ON tap that is not an end tap are OFF, and both taps neighboring each OFF tap that is not an end tap are ON.

In a second instance of the first implementation, the adaptive control circuitry may be configured to initially power ON, as the first subset of the plurality of filter taps, every third filter tap, corresponding to every third segment along the cable length of the wireline channel medium, such that both taps neighboring each ON tap that is not an end tap are OFF, and each OFF tap that is not an end tap has a first neighboring tap that is ON and a second neighboring tap that is OFF.

In a second implementation of such a physical layer transceiver, the adaptive control circuitry may be configured to initially power ON, as the first subset of the plurality of filter taps, different distributions of filter taps corresponding to different blocks along the cable length of the wireline channel medium.

In a first instance of the second implementation, the different distributions of powered-ON filter taps corresponding to different blocks include a first proportion of powered-ON filter taps corresponding to a block having a first susceptibility to interference, and a second proportion, greater than the first proportion, of powered-ON filter taps corresponding to a block having a second susceptibility, greater than the first susceptibility, to interference.

In a first variant of that first instance, the different distributions of powered-ON filter taps corresponding to different blocks include the first proportion of powered-ON filter taps, where the first proportion of powered-ON filter taps corresponds to a block of segments in a portion of the wireline channel medium remote from a connector, and the second proportion of powered-ON filter taps, where the second proportion of powered-ON filter taps corresponds to a block of segments in a portion of the wireline channel medium adjacent to a connector.

In a second variant of that first instance, the different distributions of powered-ON filter taps corresponding to different blocks include the first proportion of powered-ON filter taps, where the first proportion of powered-ON filter taps corresponds to a block of segments in a portion of the wireline channel medium that is not subject to changes in temperature, and the second proportion of powered-ON filter taps, where the second proportion of powered-ON filter taps corresponds to a block of segments in a portion of the wireline channel medium that is subject to changes in temperature.

In a third variant of that first instance, the different distributions of powered-ON filter taps corresponding to different blocks include the first proportion of powered-ON filter taps, where the first proportion of powered-ON filter taps corresponds to a block of segments in a portion of the wireline channel medium that is not subject to physical disturbance, and the second proportion of powered-ON filter taps, where the second proportion of powered-ON filter taps corresponds to a block of segments in a portion of the wireline channel medium that is subject to physical bending.

According to that variant, the physical layer transceiver may be for use in an automotive Ethernet system in which wireline channel medium is an automotive Ethernet cable in a vehicle, and the different distributions of powered-ON filter taps corresponding to different blocks include the first proportion of powered-ON filter taps, where the first proportion of powered-ON filter taps corresponds to a block of segments in a portion of the automotive Ethernet cable that is well-secured to the vehicle, and the second proportion of powered-ON filter taps, where the second proportion of powered-ON filter taps corresponds to a block of segments in a portion of the automotive Ethernet cable that is poorly secured to the vehicle.

In a third implementation of such a physical layer transceiver, the adaptive control circuitry may be further configured to, upon lack of detection, after a predetermined time period has elapsed, of an interference event in segments to which a group of filter taps that are powered-ON correspond, power OFF one or more filter taps in the group of filter taps.

In a first variant of that third implementation, the adaptive control circuitry may be configured to power OFF the one or more filter taps in a group of filter taps that are powered-ON, when total interference energy of filter taps in the group of filter taps that are powered-ON falls below a first predetermined threshold, and to power ON one or more additional filter taps in the vicinity of the particular filter tap when total interference energy of filter taps in the group of filter taps, corresponding to segments in the vicinity of the segment to which the particular filter tap corresponds, that are powered-ON, exceeds a second predetermined threshold greater than the first predetermined threshold.

A method in accordance with implementations of the subject matter of this disclosure for filtering interference in a physical layer transceiver for connecting a host device to a wireline channel medium having a cable length, and having adaptive filter circuitry including a plurality of filter taps, each filter tap in the plurality of filter taps corresponding to a segment of the cable length of the wireline channel medium, and being separately controllable from each other filter tap in the plurality of filter taps, includes powering ON a first subset of the plurality of filter taps, fewer than all of the filter taps, corresponding to segments distributed along the cable length of the wireline channel medium, monitoring powered-ON filter taps for occurrence of interference events in segments to which the powered-ON filter taps correspond, and upon detection of an interference event at a segment to which a particular powered-ON filter tap corresponds, powering ON one or more additional filter taps corresponding to one or more segments in a vicinity of the segment to which the particular filter tap corresponds.

In a first implementation of such a method, initially powering ON the first subset of the plurality of filter taps may include initially powering ON, as the first subset of the plurality of filter taps, filter taps corresponding to segments distributed along the cable length of the wireline channel medium.

In a first variant of that first implementation, initially powering ON the first subset of the plurality of filter taps may include initially powering ON every other filter tap, corresponding to every other segment along the cable length of the wireline channel medium, such that both taps neighboring each ON tap that is not an end tap are OFF, and both taps neighboring each OFF tap that is not an end tap are ON.

In a second variant of that first implementation, initially powering ON the first subset of the plurality of filter taps may include initially powering ON every third filter tap, corresponding to every third segment along the cable length of the wireline channel medium, such that both taps neighboring each ON tap that is not an end tap are OFF, and each OFF tap that is not an end tap has a first neighboring tap that is ON and a second neighboring tap that is OFF.

In a second implementation of such a method, initially powering ON the first subset of the plurality of filter taps may include initially powering ON, as the first subset of the plurality of filter taps, different distributions of filter taps corresponding to segments in different blocks along the cable length of the wireline channel medium.

In a first instance of that second implementation, initially powering ON, as the first subset of the plurality of filter taps, different distributions of filter taps corresponding to segments in different blocks along the cable length of the wireline channel medium, may include powering ON a first proportion of filter taps corresponding to segments in a block having a first susceptibility to interference, and powering ON a second proportion, greater than the first proportion, of filter taps corresponding to segments in a block having a second susceptibility, greater than the first susceptibility, to interference.

In a first variant of that first instance, powering ON a second proportion, greater than the first proportion, of filter taps corresponding to segments in a block having a second susceptibility, greater than the first susceptibility, to interference, may include powering ON filter taps corresponding to segments in a block of segments in portions of the wireline channel medium adjacent to a connector, and powering ON a first proportion of filter taps corresponding to segments in a block having a first susceptibility to interference may include powering ON filter taps corresponding to segments in a block of segments that correspond to portions of the wireline channel medium remote from a connector.

In a second variant of that first instance, powering ON a first proportion of filter taps corresponding to segments in a block having a first susceptibility to interference may include powering ON filter taps corresponding to segments in a portion of the wireline channel medium that is not subject to changes in temperature, and powering ON a second proportion, greater than the first proportion, of filter taps corresponding to segments in a block having a second susceptibility, greater than the first susceptibility, to interference, may include powering ON filter taps corresponding to segments in a portion of the wireline channel medium that is subject to changes in temperature.

In a third variant of that first instance, powering ON a first proportion of filter taps corresponding to segments in in a block having a first susceptibility to interference may include powering ON filter taps corresponding to segments in a portion of the wireline channel medium that is not subject to physical disturbance, and powering ON a second proportion, greater than the first proportion, of filter taps corresponding to segments in a block having a second susceptibility, greater than the first susceptibility, to interference, may include powering ON filter taps corresponding to segments in a portion of the wireline channel medium that is subject to physical bending.

According to that third variant of the first instance, powering ON filter taps corresponding to segments in the block having the first susceptibility to interference may include powering ON filter taps in a block of segments that correspond to portions of an Ethernet cable, in an automotive Ethernet system of a vehicle, that are well-secured to the vehicle, and powering ON filter taps corresponding to segments in the block having the second susceptibility, greater than the first susceptibility, to interference, may include powering ON a block of segments that correspond to portions of the Ethernet cable, in the automotive Ethernet system, that are poorly secured to the vehicle.

A third implementation of such a method may further include, upon lack of detection, after a predetermined time period has elapsed, of an interference event in segments to which a group of filter taps that are powered-ON correspond, powering OFF one or more filter taps in the group of filter taps.

That third implementation may include powering OFF the one or more filter taps in a block of filter taps when total interference energy of filter taps in the group of filter taps that are powered-ON falls below a first predetermined threshold, and powering ON the one or more additional filter taps corresponding to segments in the vicinity of the segment to which the particular filter tap corresponds when total interference energy of filter taps in the group of filter taps, corresponding to segments in the vicinity of the segment to which the particular filter tap corresponds, that are powered-ON, exceeds a second predetermined threshold greater than the first predetermined threshold.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
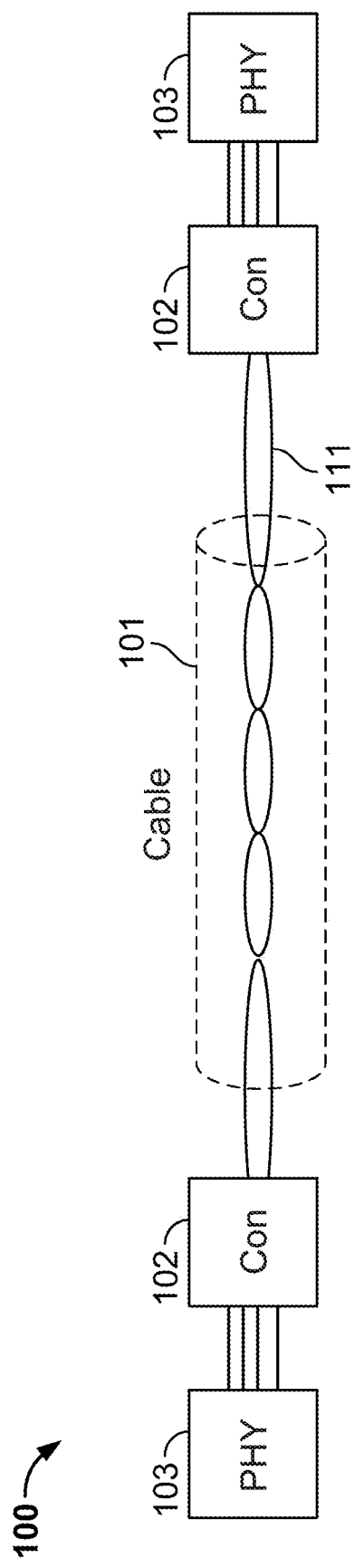
FIG. 1 is a representation of an automotive Ethernet physical link in which an implementation of the subject matter of this disclosure may be used.

As noted above, physical layer devices for high-speed wireline serial communications, such as 1000 Base-T or 10G Base-T lines, typically use adaptive filters for equalization, including cancellation of echo, crosstalk and/or RF interference. A typical adaptive filter may include echo cancellation circuitry to perform echo cancellation, near-end crosstalk cancellation circuitry to perform near-end crosstalk cancellation, and/or far-end crosstalk cancellation circuitry to perform far-end crosstalk cancellation. The adaptive filter may have a plurality of taps, with each tap covering a segment of the cancellation circuitry, corresponding to a respective segment of the wireline link. The coefficients of each segment are adapted with an algorithm such as, e.g., least-mean-squares, to maximize the effectiveness of the cancellation circuitry. However, in typical cancellation scenarios, the crosstalk or echo points do not occur uniformly along a cable but rather are localized at certain sections along a specific cable deployment. As a result, power is wasted in running and updating some filter segments that may not be needed. The filter segments may have individual power-down capability, and one possible way to address the issue of running unnecessary filter segments this is to power down those segments which have very low coefficient values. However, the powering down of such segments would be an irreversible process, because once an particular segment has been powered down, there would no longer be any more information available to determine if a dynamic change in the channel has occurred that might require that the powered-down segment be powered back up to deal with some newly-occurring interference.

For example, the wireline connection in question may be a fixed cable in a data center which is normally under stable conditions. Under those conditions, large portions of the cable may be free of interference, while segments near connectors are more susceptible to interference. In theory, then, filter taps corresponding to the interference-free segments may be turned off. However, fluctuations in temperature, or physical movement ("cable shake") or bending (i.e., kinking) of the cable (e.g., by a technician working nearby) may change interference conditions on the cable to the point that it would be desirable to reactivate at least some of the filter taps that had been turned OFF, for cancellation of newly-arisen interference. But when filter taps turned OFF, there is no way to sense the new interference and determine a need to power ON those filter taps to mitigate the new interference. Instead, it would be necessary to shut down the wireline link altogether, so that it could be re-enabled with appropriate filter taps active in view of the current interference situation.

In another situation, the wireline connection in question may be an automotive Ethernet cable. In some scenarios, the cable may be subject to environmental changes, such as temperature changes, which are not necessarily uniform throughout the vehicle. Moreover, if the cable is poorly or not properly secured to the vehicle, the cable may move (including possibly bending or kinking) as the vehicle accelerates or road surface conditions change. If certain filter taps are deactivated because they correspond to segments that are stable when the link is established based on conditions at that time—e.g., when the vehicle is stationary—then when the conditions change and formerly stable segments become subject to interference, there is no way to sense to the new interference and power ON those filter taps to mitigate the new interference. Instead, it would be necessary to shut down the link altogether, so that it could be re-enabled with appropriate filter taps active in view of the current interference situation. However, shutting down an automotive system while a vehicle is being driven may not be feasible.

Therefore, in accordance with implementations of the subject matter of this disclosure, instead of completely shutting down entire blocks of the filter of a cable link (i.e., entire groups of taps corresponding to multiple contiguous segments of the cable link), a "striped" approach is taken, in which filter taps corresponding to regularly-spaced cable segments are shut down. For example, every other filter tap may be shut down (i.e., a repeating pattern of "one ON, one OFF," such that both taps neighboring each ON tap that is not an end tap are OFF, and both taps neighboring each OFF tap that is not an end tap are ON), or two out of every three filter taps may be shut down (i.e., a repeating pattern of "one ON, two OFF," such that both taps neighboring each ON tap that is not an end tap are OFF, and each OFF tap that is not an end tap has a first neighboring tap that is ON and a second neighboring tap that is OFF). This "striped" approach to shutting down selected filter taps leaves enough active filter taps across a cable link that any new interference can be sensed. Not only can the filter taps that are powered-ON be used to filter the new interference, but the information regarding new interference in a region of the cable can be used to power ON—i.e., activate—additional filter taps corresponding to that region of the cable, for filtering the new interference.

Moreover, the striping pattern can be applied on a block basis. That is, different striping patterns can be used for filter taps corresponding to different portions of the cable. For example, for filter taps corresponding to cable segments in the vicinity of any connector, every tap can be powered ON, while for taps corresponding to areas known to be well-connected to a vehicle frame (in an automotive case), or otherwise to be physically stable, all taps can be powered OFF because the occurrence of new interference is considered to be unlikely, but for taps corresponding to other portions of the cable where new interference is more likely (but still less likely than near a connector), every other tap or two of every three taps (or any other suitable pattern) can be powered OFF.

The subject matter of this disclosure may be better understood by reference to FIGS. 1-9.

Implementations of the subject matter of this disclosure may be found in the physical layer transceiver (PHY) of fixed, or "enterprise," Ethernet links, or in automotive Ethernet links.

An automotive Ethernet physical link 100 in which an implementation of the subject matter of this disclosure may be used is shown in FIG. 1, connecting two physical layer transceivers 103, one of which may be located in an electronic control unit (ECU) of a vehicle, and another of which may be located in a functional module of the vehicle. Each PHY 103 is connected via a respective connector 102 to channel medium 101 which, in this implementation, is a cable including a single twisted copper wire pair 111 (which may be shielded or unshielded).

Figure 2:
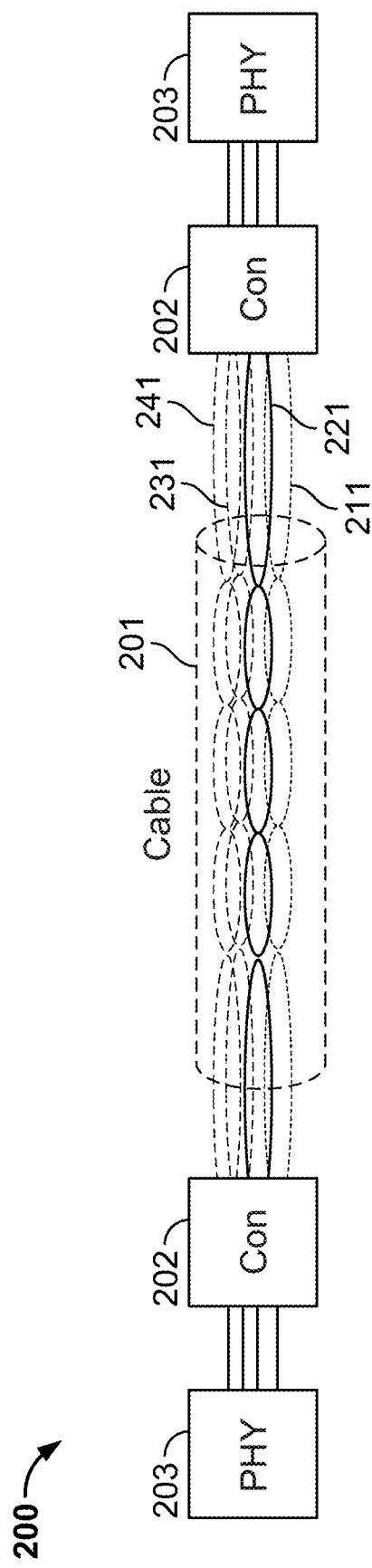
FIG. 2 is a representation of an enterprise Ethernet physical link in which an implementation of the subject matter of this disclosure may be used.

An enterprise Ethernet physical link 200 in which an implementation of the subject matter of this disclosure may be used is shown in FIG. 2, connecting two physical layer transceivers 203, each of which may be located in a respective data processing or storage device. Each PHY 203 is connected via a respective connector 202 to channel medium 201 which, in this implementation, is a cable including four unshielded twisted copper wire pairs 211, 221, 231, 241.

From the perspective of this disclosure, PHYs 103 and PHYs 203 are identical in relevant respects. An implementation of a PHY 300, shown in FIG. 3, may be used as either PHY 103 or PHY 203.

PHY 300 couples a host, such as functional module 301, which may be an automotive module, or a data processing or storage module of an enterprise system, to wireline channel medium (cable) 101/201, using well-known encoding and decoding circuitry 302. One or more of adaptive filters 303, including echo canceller(s) 313, NEXT canceller(s) 323 and FEXT canceller(s) 333, filter the effects of interference from echo and/or near-end crosstalk and/or far-end crosstalk, respectively.

Figure 3:
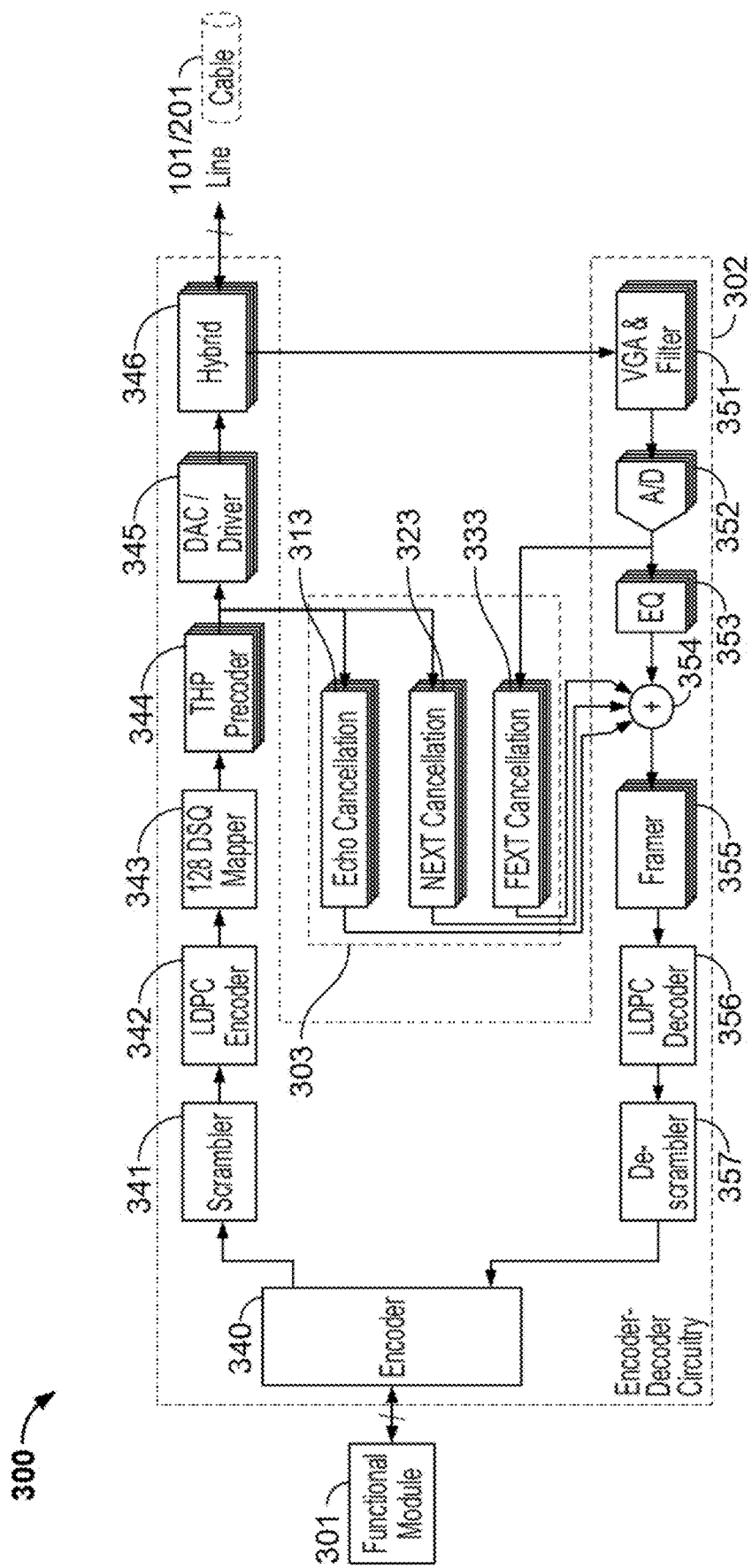
FIG. 3 is a modular diagram of a physical layer transceiver in accordance with implementations of the subject matter of this disclosure.

The encoding and decoding circuitry 302 may include, in the implementation shown in FIG. 3, a single transmitter path/channel and a single receiver path/channel for data. In the transmitter portion of the transceiver, an encoder 340 can be used to encode data desired to be transmitted, followed by a scrambler 341 for self-synchronized scrambling of the data to be transmitted, providing clock transitions, a statistically random power spectrum for EMI (electromagnetic interference) control, equalizer convergence, etc. A low density parity check (LDPC) encoder 342 encodes the data according to the parity check for error correction. A 128DSQ mapper 343 then can use a coset-partitioned constellation to map the data to symbols, and a Tomlinson-Harashima Precoding (THP) precoder 344 can then be used to adjust the transmitted signal to help the far-end receiver to equalize the signal when received at the link-partner. A digital-to-analog converter (DAC) and driver block 345 converts the data to analog form for transmission and transmits the data via the hybrid coupler and transformer block 346 onto the line 101/201.

In a receiver portion of the transceiver, data may be received at the hybrid coupler and transformer block 346. and sent to an analog front end for the receiver which can include a variable gain amplifier (VGA) and filter 351 for filtering, and an analog-to-digital converter (A/D) 352. An equalizer block 353 can include one or more equalizers to remove interference. The output of the equalizer block 353 is summed with the outputs of filters 303 (described below) at adder 354. The output of the adder can be provided to a framer 355 that extracts frames from the received data and provides the frames to an LDPC decoder 356 which error-corrects the data. The data can then be provided to a de-scrambler 357 which outputs de-scrambled data to the encoder 340 for provision to functional module 301 of the host.

Figure 4:
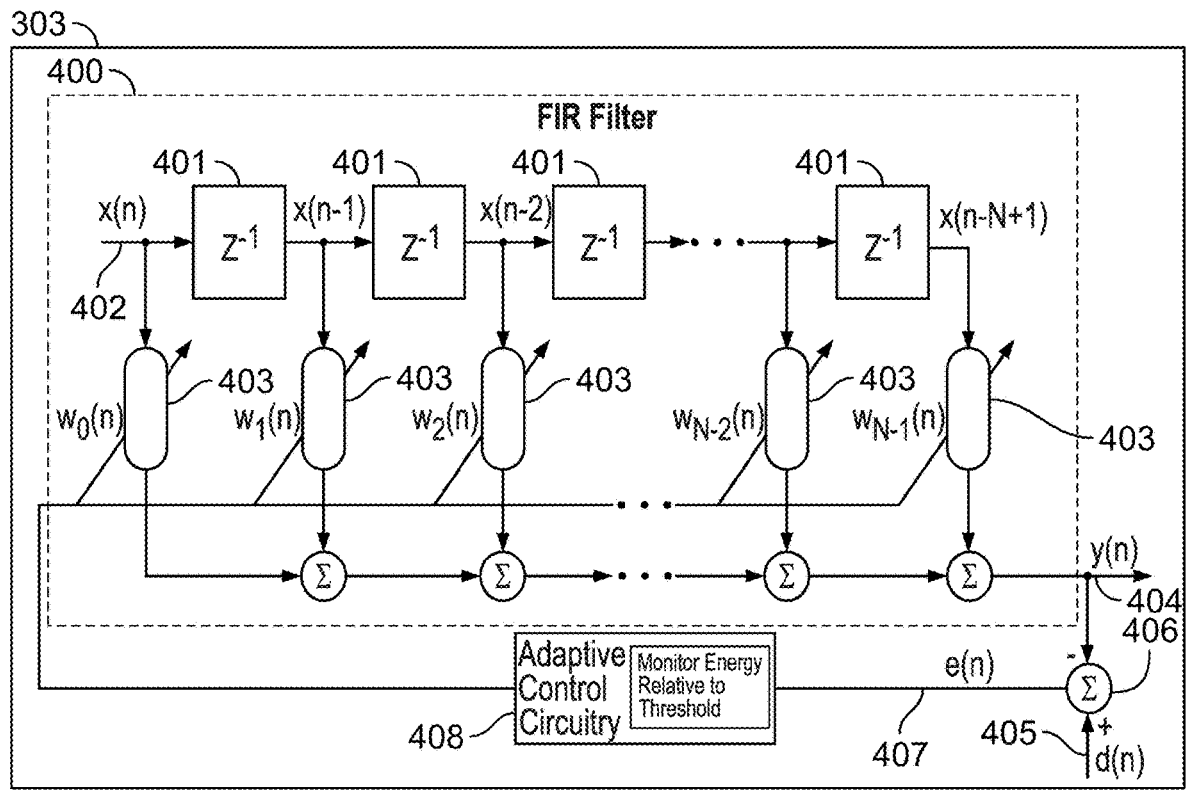
FIG. 4 shows an implementation of adaptive filter circuitry in accordance with implementations of the subject matter of this disclosure.

As shown in FIG. 4, one instance of adaptive filter circuitry 303 (which may be an echo canceller 313, a NEXT canceller 323 or a FEXT canceller 333), may be a finite impulse response (FIR) filter 400 having N stages (0, ..., N−1) 401 operating on inputs x(n) 402, and having N corresponding taps $w_i(n)$, (i=0, ..., N−1) 403. Estimates y(n) may be a measure (e.g., the sum of the squares) of total interference energy in the taps being monitored, and are output at 404 to a decoder (not shown) that provides decisions d(n) 405, which are compared to estimates y(n) 404 at 406 to yield error signals e(n) 407. Error signals e(n) 407 are used by adaptive control circuitry 408 to control taps 403, including adapting the coefficients of each tap 403, or turning a particular tap 403 ON or OFF.

Figure 5:
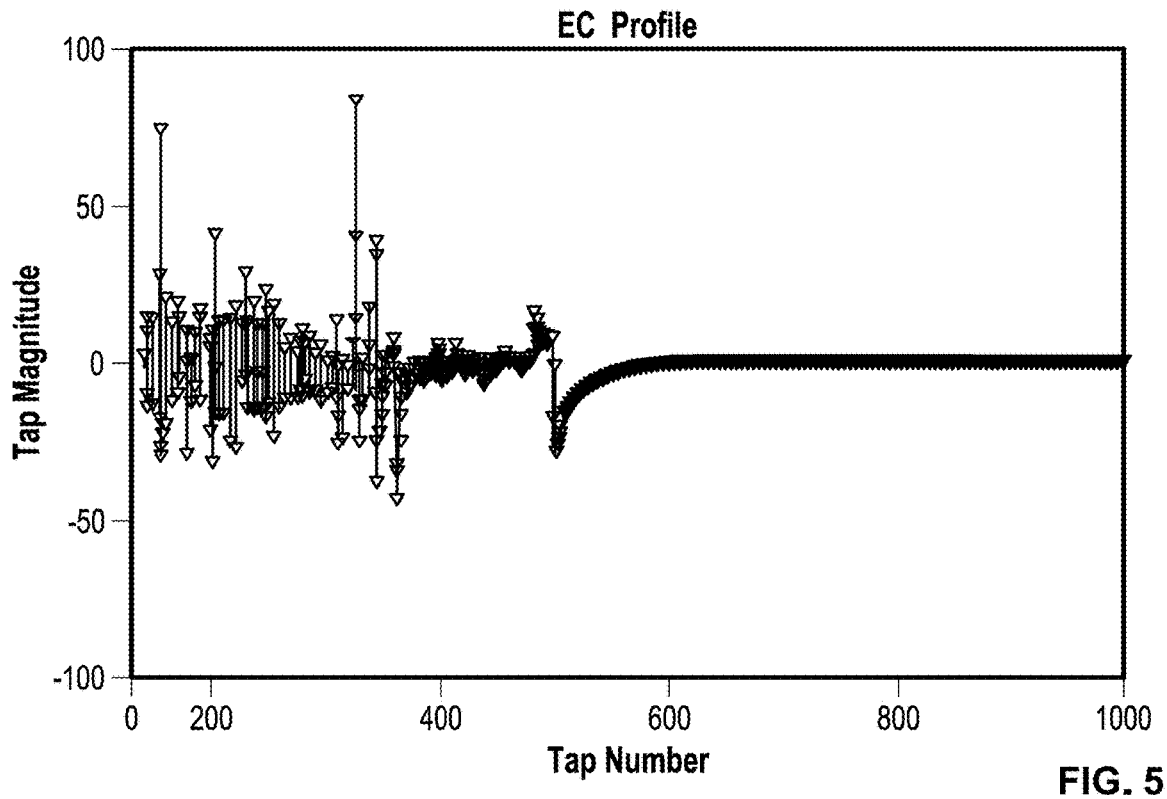
FIG. 5 is a representative graph of potential filter coefficients in the implementation of FIG. 4.

Each tap 403 consumes power. However, the coefficients for many of taps 403 may be very small, and even close to 0. As shown in FIG. 5 (in which tap numbers are indicated on the abscissa and coefficient, or tap, magnitudes are indicated on the ordinate) for one example of an echo cancelling filter, taps numbered 300-400 and taps numbered 600-1000 have coefficients at or near 0. Therefore, such taps could be turned OFF to save power, but, as noted above, in typical adaptive filters, once a tap is turned OFF, it remains OFF until the link in question is disconnected and reestablished.

Figure 6:
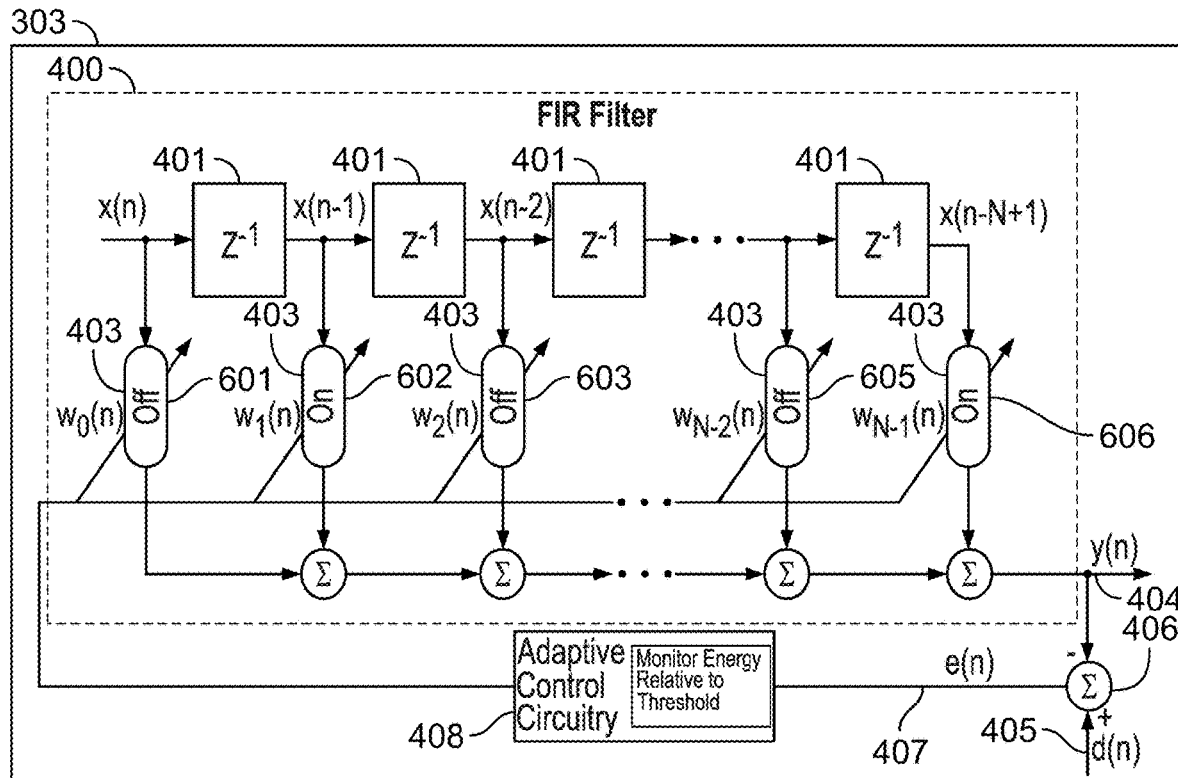
FIG. 6 shows an implementation of adaptive filter circuitry as in FIG. 4 with a first interleaved pattern of ON and OFF filter taps.

Therefore, in accordance with implementations of the subject matter of this disclosure, power may be saved without sacrificing the ability to turn a tap back ON, by "striping" the taps—i.e., turning OFF (powering down) taps—in a regular pattern. In an example that is shown only partially in FIG. 6, every other tap 403 is turned OFF, while the other ones of taps 403, interleaved with the taps that are turned OFF, remain ON (such that there is a repeating pattern of "one ON, one OFF," whereby both taps neighboring each ON tap that is not an end tap are OFF, and both taps neighboring each OFF tap that is not an end tap are ON). That is, of the taps visible in FIG. 6, taps 601, 603, 605 are turned OFF, while taps 602, 606 are turned on (although only five taps are shown in FIGS. 4 and 6, in practice there are several hundred taps (indeed, FIG. 5 displays coefficient values for 1,000 taps)). Although selected taps are powered OFF, e.g., to conserve power, because there are powered-ON taps close to every powered-OFF tap, if a new interference event occurs in the vicinity of a powered-OFF tap, that new interference event can be detected by a nearby powered-ON tap and the information regarding the interference event can be used to turn back on the powered-OFF tap or taps.

Figure 7:
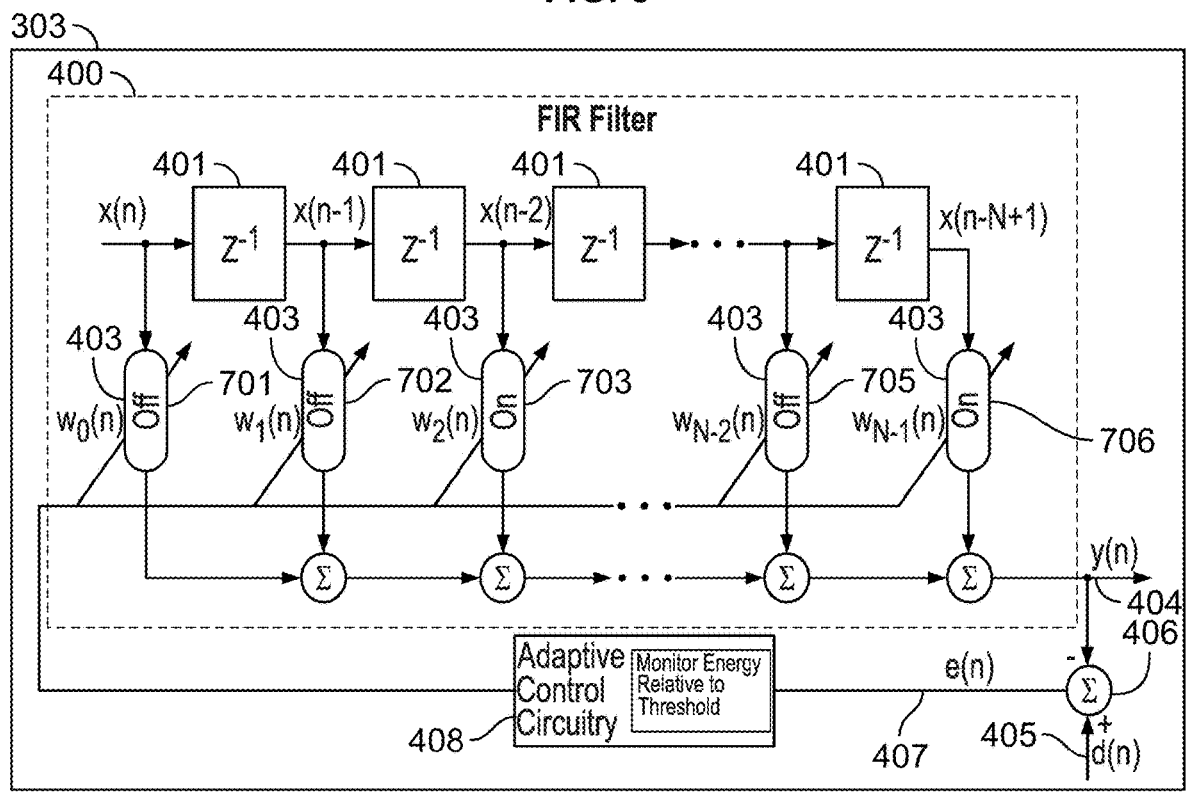
FIG. 7 shows an implementation of adaptive filter circuitry as in FIG. 4 with a second interleaved pattern of ON and OFF filter taps.

While FIG. 6 shows a portion of an example where every other tap is powered ON, meaning also that every other tap is powered OFF, other interleaved patterns of taps may be used. Thus, FIG. 7 shows a portion of an example of a pattern of taps in which only one in three taps (703, 706) is powered ON, while two out of three taps (701, 702, 705) are powered OFF. Alternatively (not shown), one in three taps could be powered OFF, while two out of three taps are powered ON. Although a one-in-three ON pattern provides less coverage of OFF taps, there is still at least one ON tap next to each OFF tap to sense interference in the segment covered by the OFF tap and determine a need to reactivate the OFF tap. Still further patterns may be used with even sparser coverage, as long as the ON taps are not so far from any OFF tap that new interference at that OFF tap could not be detected, as determined by the spatial resolution of the taps compared to the cable impairment that gives rise to the interference. For example, for taps that spatially represent every 10 cm of the cable, turning off every other tap will decrease the spatial resolution to every 20 cm of the cable. Impairments such as cable bend would need to be within the spatial resolution of the tap to be detectable.

Although the "striping" patterns of FIGS. 6 and 7 are uniform—1 in 2, 1 in 3—in actual implementations a uniform distribution of active or powered-ON taps may not be appropriate. As noted above, a large number of active taps may be needed for segments corresponding to cable regions near connectors. On the other hand, for segments corresponding to a stable cable portion away from connectors, very few if any active taps may be needed, and therefore only a small number should be kept active to detect, in accordance with the subject matter of this disclosure, potential changes in interference conditions that might signal that more taps should be activated. Indeed, in the example of FIG. 5, large numbers of active taps appear to be needed between tap and tap 300, and smaller number appear to be needed between tap 400 and tap 600, but very few appear to be needed between tap 300 and tap 400 and even fewer appear to be needed between tap 600 and tap 1000.

Therefore, in accordance with implementations of the subject matter of this disclosure, filter taps corresponding to segments of a wireline channel medium (i.e., cable) may be subdivided into blocks of taps corresponding to different portions of the cable. Thus, one striping pattern which may have very few taps powered down may be used in a block corresponding to segments near a connector, while a different striping pattern which may have very few taps powered ON may be used in a block corresponding to segments far from a connector. The different patterns of FIGS. 6 and 7 may be examples of different patterns in two different blocks of the same cable, respectively having a first proportion of taps powered ON and a second proportion of taps powered ON. Although the differences between pattern 600 and pattern 700 may be small, the differences between patterns in different blocks may be more significant depending on the actual interference conditions.

While it may be possible to control individual taps, powering ON, for example, a single tap or a small number of taps based on interference data from nearby taps, one technique for controlling the taps may be to measure the interference energy in the active taps. Thus, at initialization of a link, all taps could be active, and the interference energy in the taps can be measured and totaled. If, after initial filter training has been completed, the total interference energy in the taps in a block is below a first threshold, then a striping pattern of tap deactivations is applied to that block. The particular pattern applied could be based on the probability of encountering interference based on, e.g., proximity to a connector or other cable deployment characteristics. Alternatively, the same striping pattern could be used for every block. Once the striping pattern has been applied to a block, the interference energy in the active taps in that block continues to be monitored and, if the interference energy in the active taps, as represented by the estimates y(n), rises above a second threshold (which may be higher than the first threshold), then an interference event is inferred and the inactive taps in the block are reactivated.

Figure 8:
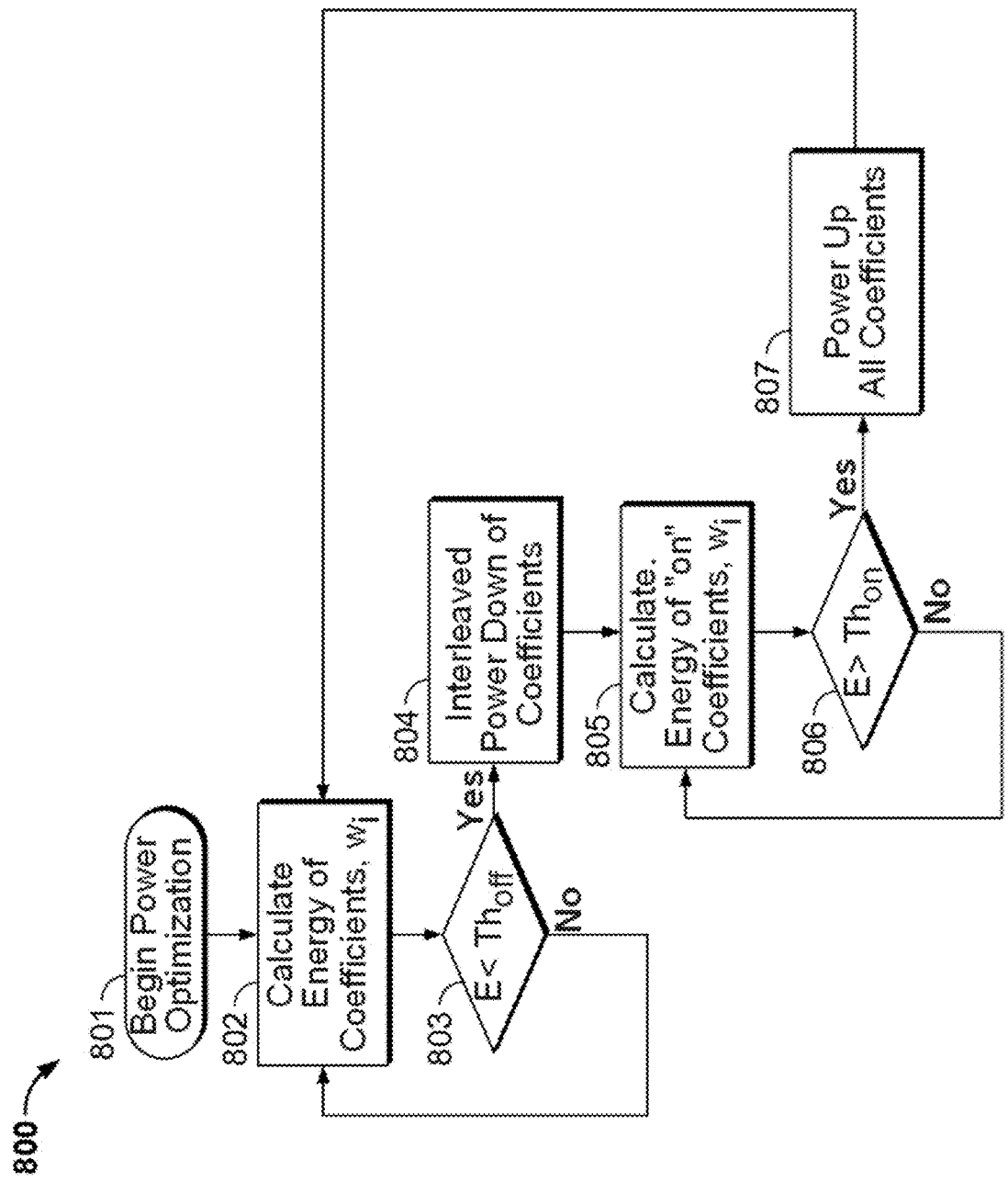
FIG. 8 is a flow diagram illustrating a power optimization technique in accordance with implementations of the subject matter of this disclosure.
Figure 9:
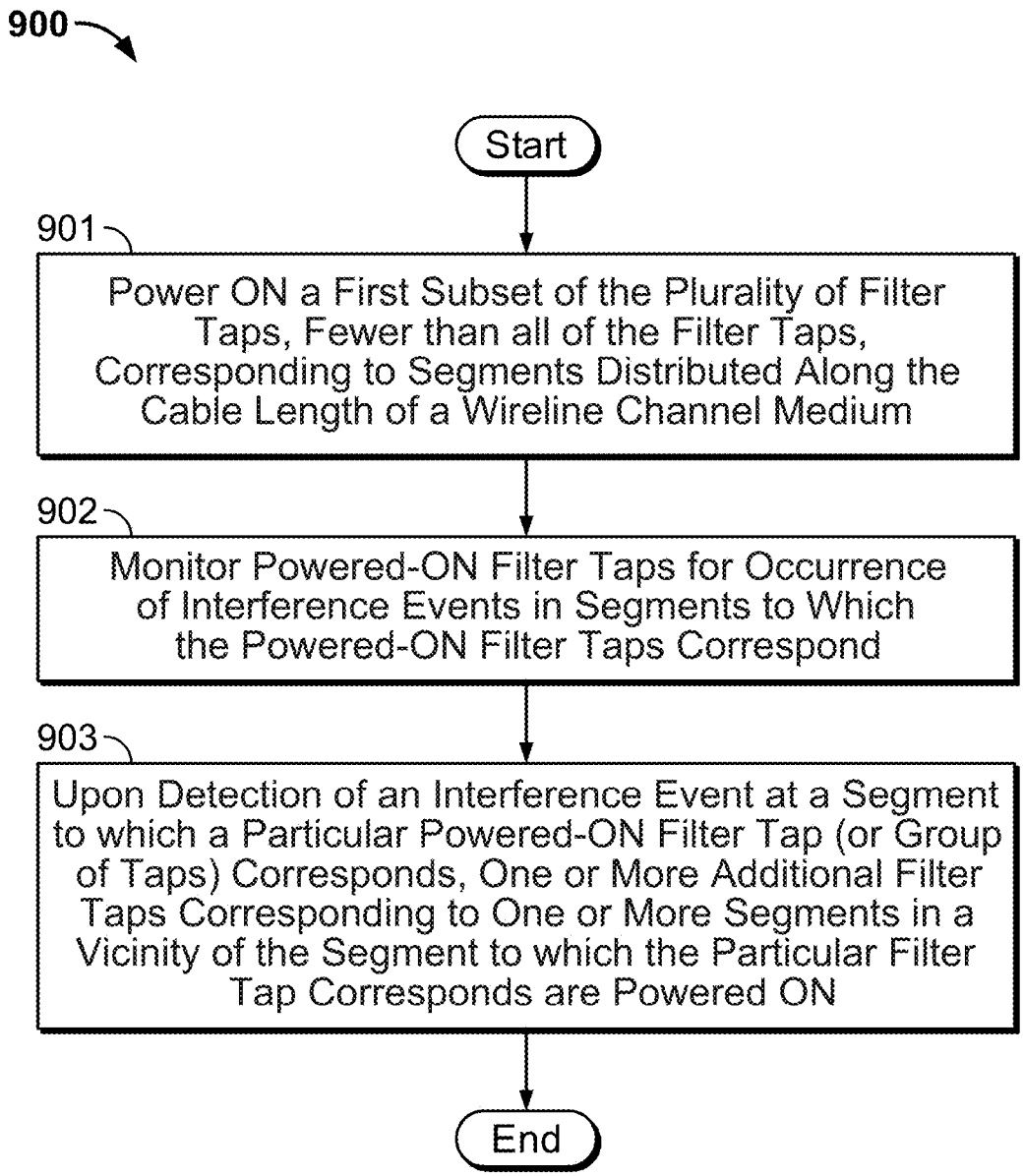
FIG. 9 is a flow diagram illustrating a method of operation in accordance with implementations of the subject matter of this disclosure.

The foregoing power optimization technique 800, which may be performed by adaptive control circuitry 408, is diagrammed in FIG. 8 and begins at 801. At 802, the total interference energy (E) in the taps/coefficients $w_i$ that are currently operating (powered ON) is determined (e.g., from the sum of the squares of the active coefficients).

At 803, it is determined whether the total interference energy (E) is below the aforementioned first threshold ($TH_{off}$) for powering down some of the active taps/coefficients ($w_i$). If not, flow returns to 802 to continue monitoring the total interference energy (E). But if at 803, it is determined that the total interference energy (E) is below the aforementioned first threshold ($TH_{off}$) for powering down some of the active taps/coefficients ($w_i$), then the interference is very low and at 804, powering down of certain taps/coefficients ($w_i$), according to a pattern such as one of the patterns described above, is performed.

At 805, the total interference energy (E) in the taps/coefficients $w_i$ that remain operating (powered ON) continues to be determined. At 806, it is determined whether the total interference energy (E) is above the aforementioned second threshold ($TH_{on}$) for powering ON the taps/coefficients ($w_i$) that have been powered OFF. If not, then interference remains low and flow returns to 805 to continue monitoring the total interference energy (E) in the taps/coefficients $w_i$ that remain operating. But if at 806, it is determined that the total interference energy (E) is above the aforementioned second threshold ($TH_{on}$) for powering ON the taps/coefficients ($w_i$) that have been powered OFF, then at 807 all taps/coefficients ($w_i$) that had been powered OFF are powered back ON, and flow returns to 802 to continue monitoring the total interference energy (E) in the taps/coefficients $w_i$ that are operating.

Although in method 800 there is only one OFF threshold and one ON threshold, there could be multiple thresholds (not shown) so that there could be not only situations where all taps/coefficients $w_i$ are powered ON or a predetermined subset of taps/coefficients $w_i$ that are powered OFF, but instead there could be different subsets of taps/coefficients $w_i$ of different subset sizes that are powered OFF depending on the degree of interference as measured by the total interference energy (E).

More generally, a method 900 (FIG. 9) according to implementations of the subject matter of this disclosure begins at 901, where a first subset of the plurality of filter taps, fewer than all of the filter taps, corresponding to segments distributed along the cable length of a wireline channel medium, are powered ON. This could be the result of a design decision that the system would be initially powered ON with that subset of filter taps active, or could be the result of the system initially being powered ON with all filter taps, with some of the filter taps having subsequently been powered OFF based on a measurement of interference below a threshold as at 803.

At 902, powered-ON filter taps are monitored for occurrence of interference events in segments to which the powered-ON filter taps correspond. As noted above, this monitoring could be based on total interference energy, and could be performed on a per-block basis, with different blocks of filter taps being monitored separately (and potentially being subject to different thresholds).

At 903, upon detection at 902 of an interference event at a segment to which a particular powered-ON filter tap (or group of taps) corresponds, one or more additional filter taps corresponding to one or more segments in a vicinity of the segment to which the particular filter tap corresponds are powered ON, and method 900 ends.

Thus it is seen that the dynamic powering down and powering up of segments of adaptive filters in response to dynamic changes in the channel being filtered, thereby conserving power, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A physical layer transceiver for connecting a host device to a wireline channel medium having a cable length, the physical layer transceiver comprising:
   a host interface for coupling to the host device;
   a line interface for coupling to the wireline channel medium;
   encoding/decoding circuitry operatively coupled to the host interface and the line interface for interfacing between the host device and the wireline channel medium; and
   adaptive filter circuitry operatively coupled to the encoding/decoding circuitry, the adaptive filter circuitry comprising:
   a plurality of filter taps, each filter tap in the plurality of filter taps corresponding to a segment of the cable length of the wireline channel medium, and being capable of being powered ON and OFF separately from each other filter tap in the plurality of filter taps, and
   adaptive control circuitry configured to:
   power ON a first subset of the plurality of filter taps, fewer than all of the filter taps, corresponding to segments distributed along the cable length of the wireline channel medium,
   monitor powered-ON filter taps for occurrence of interference events, and
   upon detection of an interference event at a segment to which a particular powered-ON filter tap corresponds, power ON one or more additional filter taps corresponding to one or more segments in a vicinity of segment to which the particular filter tap corresponds.

2. The physical layer transceiver of claim 1 wherein the adaptive control circuitry is configured to initially power ON, as the first subset of the plurality of filter taps, filter taps corresponding to segments that are distributed along the cable length of the wireline channel medium.

3. The physical layer transceiver of claim 2 wherein the adaptive control circuitry is configured to initially power ON, as the first subset of the plurality of filter taps, every other filter tap, corresponding to every other segment along the cable length of the wireline channel medium, wherein both taps neighboring each ON tap that is not an end tap are OFF, and both taps neighboring each OFF tap that is not an end tap are ON.

4. The physical layer transceiver of claim 2 wherein the adaptive control circuitry is configured to initially power ON, as the first subset of the plurality of filter taps, every third filter tap, corresponding to every third segment along the cable length of the wireline channel medium, wherein both taps neighboring each ON tap that is not an end tap are OFF, and each OFF tap that is not an end tap has a first neighboring tap that is ON and a second neighboring tap that is OFF.

5. The physical layer transceiver of claim 1 wherein the adaptive control circuitry is configured to initially power ON, as the first subset of the plurality of filter taps, different distributions of filter taps corresponding to different blocks along the cable length of the wireline channel medium.

6. The physical layer transceiver of claim 5 wherein the different distributions of powered-ON filter taps corresponding to the different blocks comprise:
   a first proportion of powered-ON filter taps corresponding to a block having a first susceptibility to interference; and
   a second proportion, greater than the first proportion, of powered-ON filter taps corresponding to a block having a second susceptibility, greater than the first susceptibility, to interference.

7. The physical layer transceiver of claim 6 wherein the different distributions of powered-ON filter taps corresponding to the different blocks comprise:

the first proportion of powered-ON filter taps, wherein the first proportion of powered-ON filter taps corresponds to a block of segments in a portion of the wireline channel medium remote from a connector; and the second proportion of powered-ON filter taps, wherein the second proportion of powered-ON filter taps corresponds to a block of segments in a portion of the wireline channel medium adjacent to a connector.

8. The physical layer transceiver of claim 6 wherein the different distributions of powered-ON filter taps corresponding to the different blocks comprise:

the first proportion of powered-ON filter taps, wherein the first proportion of powered-ON filter taps corresponds to a block of segments in a portion of the wireline channel medium that is not subject to changes in temperature; and the second proportion of powered-ON filter taps, wherein the second proportion of powered-ON filter taps corresponds to a block of segments in a portion of the wireline channel medium that is subject to changes in temperature.

9. The physical layer transceiver of claim 6 wherein the different distributions of powered-ON filter taps corresponding to the different blocks comprise:

the first proportion of powered-ON filter taps, wherein the first proportion of powered-ON filter taps corresponds to a block of segments in a portion of the wireline channel medium that is not subject to physical disturbance; and the second proportion of powered-ON filter taps, wherein the second proportion of powered-ON filter taps corresponds to a block of segments in a portion of the wireline channel medium that is subject to physical bending.

10. The physical layer transceiver of claim 9 wherein:

the physical layer transceiver is for use in an automotive Ethernet system in which the wireline channel medium is an automotive Ethernet cable in a vehicle; and the different distributions of powered-ON filter taps corresponding to the different blocks comprise:

the first proportion of powered-ON filter taps, wherein the first proportion of powered-ON filter taps corresponds to a block of segments in a portion of the automotive Ethernet cable that is well-secured to the vehicle, and the second proportion of powered-ON filter taps, wherein the second proportion of powered-ON filter taps corresponds to a block of segments in a portion of the automotive Ethernet cable that is poorly secured to the vehicle.

11. The physical layer transceiver of claim 1 wherein the adaptive control circuitry is further configured to:

upon lack of detection, after a predetermined time period has elapsed, of an interference event in segments to which a group of filter taps that are powered-ON correspond, power OFF one or more filter taps in the group of filter taps.

12. The physical layer transceiver of claim 11 wherein the adaptive control circuitry is configured to:

power OFF the one or more filter taps in the group of filter taps that are powered-ON, when total interference energy of filter taps in the group of filter taps that are powered-ON falls below a first predetermined threshold; and power ON the one or more additional filter taps in the vicinity of the particular filter tap when total interference energy of filter taps in the group of filter taps, corresponding to segments in the vicinity of the segment to which the particular filter tap corresponds, that are powered-ON, exceeds a second predetermined threshold greater than the first predetermined threshold.

13. A method of filtering interference in a physical layer transceiver for connecting a host device to a wireline channel medium having a cable length, and having adaptive filter circuitry including a plurality of filter taps, each filter tap in the plurality of filter taps corresponding to a segment of the cable length of the wireline channel medium, and being separately controllable from each other filter tap in the plurality of filter taps, the method comprising:

powering ON a first subset of the plurality of filter taps, fewer than all of the filter taps, corresponding to segments distributed along the cable length of the wireline channel medium;

monitoring powered-ON filter taps for occurrence of interference events in segments to which the powered-ON filter taps correspond; and upon detection of an interference event at a segment to which a particular powered-ON filter tap corresponds, powering ON one or more additional filter taps corresponding to one or more segments in a vicinity of the segment to which the particular filter tap corresponds.

14. The method of claim 13 wherein initially powering ON the first subset of the plurality of filter taps comprises initially powering ON, as the first subset of the plurality of filter taps, filter taps corresponding to segments distributed along the cable length of the wireline channel medium.

15. The method of claim 14 wherein initially powering ON the first subset of the plurality of filter taps comprises initially powering ON every other filter tap, corresponding to every other segment along the cable length of the wireline channel medium, wherein both taps neighboring each ON tap that is not an end tap are OFF, and both taps neighboring each OFF tap that is not an end tap are ON.

16. The method of claim 14 wherein initially powering ON the first subset of the plurality of filter taps comprises initially powering ON every third filter tap, corresponding to every third segment along the cable length of the wireline channel medium, wherein both taps neighboring each ON tap that is not an end tap are OFF, and each OFF tap that is not an end tap has a first neighboring tap that is ON and a second neighboring tap that is OFF.

17. The method of claim 13 wherein initially powering ON the first subset of the plurality of filter taps comprises initially powering ON, as the first subset of the plurality of filter taps, different distributions of filter taps corresponding to segments in different blocks along the cable length of the wireline channel medium.

18. The method of claim 17 wherein initially powering ON, as the first subset of the plurality of filter taps, the different distributions of filter taps corresponding to the segments in different blocks along the cable length of the wireline channel medium, comprises:

powering ON a first proportion of filter taps corresponding to segments in a block having a first susceptibility to interference; and powering ON a second proportion, greater than the first proportion, of filter taps corresponding to segments in a block having a second susceptibility, greater than the first susceptibility, to interference.

19. The method of claim 18 wherein:

powering ON the second proportion, greater than the first proportion, of filter taps corresponding to the segments in the block having the second susceptibility, greater than the first susceptibility, to interference, comprises powering ON filter taps corresponding to segments in a block of segments in portions of the wireline channel medium adjacent to a connector; and powering ON the first proportion of filter taps corresponding to the segments in the block having the first susceptibility to interference comprises powering ON filter taps corresponding to segments in a block of segments that correspond to portions of the wireline channel medium remote from a connector.

20. The method of claim 18 wherein:

powering ON the first proportion of filter taps corresponding to the segments in the block having the first susceptibility to interference comprises powering ON filter taps corresponding to segments in a portion of the wireline channel medium that is not subject to changes in temperature; and powering ON the second proportion, greater than the first proportion, of filter taps corresponding to the segments in the block having the second susceptibility, greater than the first susceptibility, to interference, comprises powering ON filter taps corresponding to segments in a portion of the wireline channel medium that is subject to changes in temperature.

21. The method of claim 18 wherein:

powering ON the first proportion of filter taps corresponding to the segments in the block having the first susceptibility to interference comprises powering ON filter taps corresponding to segments in a portion of the wireline channel medium that is not subject to physical disturbance; and powering ON the second proportion, greater than the first proportion, of filter taps corresponding to the segments in the block having the second susceptibility, greater than the first susceptibility, to interference, comprises powering ON filter taps corresponding to segments in a portion of the wireline channel medium that is subject to physical bending.

22. The method of claim 21 wherein:

powering ON filter taps corresponding to segments in the block having the first susceptibility to interference comprises powering ON filter taps in a block of segments that correspond to portions of an Ethernet cable, in an automotive Ethernet system of a vehicle, that are well-secured to the vehicle; and powering ON filter taps corresponding to segments in the block having the second susceptibility, greater than the first susceptibility, to interference, comprises powering ON a block of segments that correspond to portions of the Ethernet cable, in the automotive Ethernet system, that are poorly secured to the vehicle.

23. The method of claim 13, further comprising, upon lack of detection, after a predetermined time period has elapsed, of an interference event in segments to which a group of filter taps that are powered-ON correspond, powering OFF one or more filter taps in the group of filter taps.

24. The method of claim 23 wherein:

powering OFF the one or more filter taps in the group of filter taps upon lack of detection of the interference event comprises powering OFF the one or more filter taps in the group of filter taps when total interference energy of filter taps in the group of filter taps that are powered-ON falls below a first predetermined threshold; and powering ON the one or more additional filter taps upon detection of the interference event comprises powering ON the one or more additional filter taps, corresponding to the segments in the vicinity of the segment to which the particular filter tap corresponds, when the total interference energy of filter taps in the group of filter taps, corresponding to the segments in the vicinity of the segment to which the particular filter tap corresponds, that are powered-ON, exceeds a second predetermined threshold greater than the first predetermined threshold.

* * * * *